(12) United States Patent
Foreman

(10) Patent No.: US 6,370,740 B1
(45) Date of Patent: Apr. 16, 2002

(54) MECHANICAL CLAMP FOR CYLINDRICAL OBJECTS

(75) Inventor: Carl R. Foreman, Rehoboth, MA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 21 days.

(21) Appl. No.: 09/595,543

(22) Filed: Jun. 16, 2000

(51) Int. Cl.⁷ .............................. A44B 21/00; E04G 7/00
(52) U.S. Cl. .............................. 24/335; 24/270; 24/339; 403/385
(58) Field of Search .......................... 24/335, 329, 330, 24/339, 270

(56) References Cited

U.S. PATENT DOCUMENTS

| | | | | |
|---|---|---|---|---|
| 2,752,174 A | * | 6/1956 | Frost | 285/194 |
| 4,438,958 A | * | 3/1984 | DeCenzo | 285/234 |
| 4,639,979 A | * | 2/1987 | Polson | 24/270 |
| 5,259,690 A | * | 11/1993 | Legge | 403/385 |
| 5,689,860 A | * | 11/1997 | Matoba et al. | 24/335 |
| 6,109,569 A | * | 8/2000 | Sakaida | 248/75 |

FOREIGN PATENT DOCUMENTS

| | | | | |
|---|---|---|---|---|
| DE | 2225629 | * | 11/1978 | 24/329 |
| FR | 0975673 | * | 3/1951 | 24/329 |

* cited by examiner

Primary Examiner—Victor Sakran
(74) Attorney, Agent, or Firm—Michael J. McGowan; Prithvi C. Lall; Michael F. Oglo

(57) ABSTRACT

A clamp for cylindrical objects uses a plurality of split-rings, each of which has a first half-ring and a second half-ring. Each first half-ring is hingedly coupled to a corresponding second half-ring at a hinge point. Means, coupled to each first half-ring at a distance from the hinge point, are coupled to a control assembly. The control assembly is operated to apply one of a pulling force to each first half-ring to simultaneously open each of the split-rings, or a pushing force to each first half-ring to simultaneously close each of the split-rings.

23 Claims, 1 Drawing Sheet

MECHANICAL CLAMP FOR CYLINDRICAL OBJECTS

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to clamps for cylindrical objects, and more particularly to a mechanical clamp for deploying and retrieving cylindrical objects from a platform such as the deployment/retrieval of cylindrical objects from the side of a boat or ship.

(2) Description of the Prior Art

The Navy uses cylindrically-shaped, unmanned underwater vehicles (UUV) for a variety of tasks to include underwater information collection, underwater vehicle testing, military exercises, etc. For many of these tasks, the UUV is deployed and then retrieved from the deck of a surface platform or ship. In most instances, the UUV is hoisted from the water or lowered into the water using a number of poles, each of which has a hooked end. This requires at least two people and requires the people to raise or lower the UUV in unison to keep the UUV from sliding out of one or both hooks.

SUMMARY OF THE INVENTION

Accordingly, it is an object of the present invention to provide a clamp that can be used to deploy or retrieve a cylindrical object.

Another object of the present invention is to provide a clamp for cylindrical objects that can be operated to deploy and retrieve a cylindrical object from the water.

Still another object of the present invention is to provide a clamp for cylindrical objects that is of simple construction.

Yet another object of the present invention is to provide a clamp for cylindrical objects that can be operated/used by one person to deploy or retrieve the object.

Other objects and advantages of the present invention will become more obvious hereinafter in the specification and drawings.

In accordance with the present invention, a clamp for cylindrical objects is provided. Each of a plurality of split-rings has a first half-ring and a second half-ring. For each of the plurality of split-rings, a first means hingedly couples the first half-ring to the second half-ring at a hinge point. Second means are coupled to each first half-ring at a distance from the hinge point. Third means are coupled to the second means for selectively applying a pulling force thereto to simultaneously open each of the split-rings, or for selectively applying a pushing force thereto to simultaneously close each of the split-rings. The first means can be a bar passing through each first and second half-ring of the split-rings. The second means can be a bar that just passes though each first half-ring.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
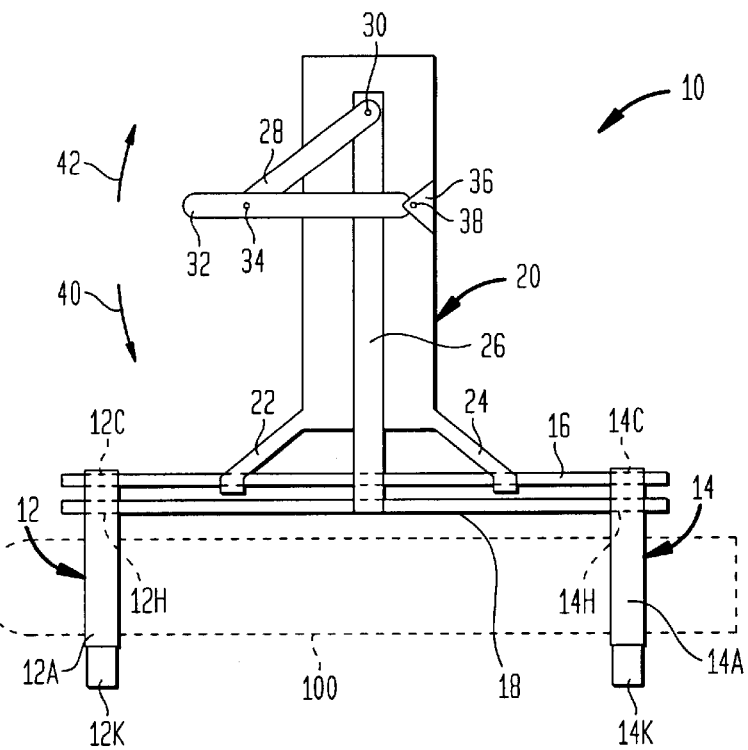
FIG. 1 is a side view of a mechanical clamp according to one embodiment of the present invention.

Referring now to the drawings, and more particularly to FIG. 1, one embodiment of a mechanical clamp is illustrated in a side view and is referenced generally by numeral 10. Clamp 10 is holding a cylindrical object 100 (shown in phantom lines) such as an unmanned underwater vehicle (UUV) that is deployed and retrieved from the water from the side of a ship (not shown). However, it is to be understood that clamp 10 can be used as a clamp for other cylindrical objects such as pipes, poles, etc.

Grasping cylindrical object 100 are two identical split-ring assemblies 12 and 14. Split-ring assembly 12 is shown in isolation in the plan view of FIG. 2. While two split-ring assemblies are shown in clamp 10, it is to be understood additional split-ring assemblies could be used without departing from the scope of the present invention. Further, since split-ring assemblies 12 and 14 are identical, a detail description of just split-ring assembly 12 will be provided herein.

Figure 3:
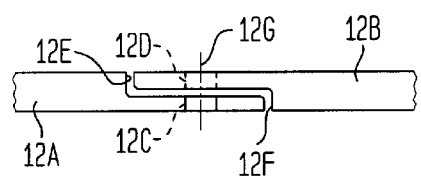
FIG. 3 is a top view of a portion of the split-ring assembly taken along line 3—3 in FIG. 2.

Split-ring assembly 12 consists of two, approximately C-shaped half-rings 12A and 12B. As best seen in FIG. 3, each of half-rings 12A and 12B is provided with a hole 12C and 12D, respectively, at one end thereof. More specifically, each such end of half-rings 12A and 12B is notched at 12E and 12F, respectively, so that the ends can nest as holes 12C and 12D are aligned. A common axis 12G of aligned holes 12C and 12D serves as a hinge point for split-ring assembly 12 as will be explained further below. Half-ring 12A is further provided with another hole 12H positioned some distance away from hole 12C. As will be explained further below, hole 12H serves as a control point for opening and closing split-ring assembly 12. Accordingly, while the exact distance between holes 12C and 12H is not critical, hole 12H should be within 90° from hole 12C.

To provide a more secure grip on cylindrical object 100, opposing surfaces of half-rings 12A and 12B can be partially or completely configured as anti-skid surfaces. For example, opposing surfaces of half-rings 12A and 12B could be roughened surfaces. More typically, opposing surfaces of half-rings 12A and 12B would have an anti-skid material 12I and 12J, respectively, affixed thereto. Materials 12I and 12J could be any material that is anti-skid with respect to cylindrical object 100. Compressible materials such as cork, neoprene, rubber, etc., are good choices since they also serve as protective cushions when split-ring assembly 12 is closed about cylindrical object 100.

Figure 2:
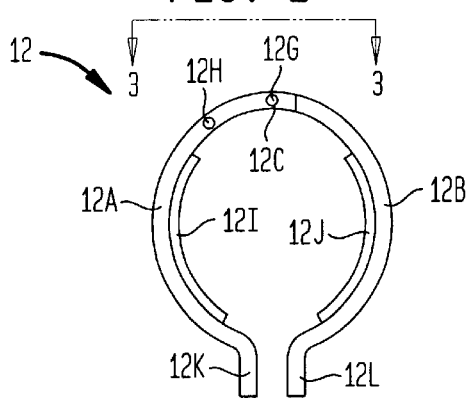
FIG. 2 is a plan view of one of the split-ring assemblies in its closed or clamping position.
Figure 4:
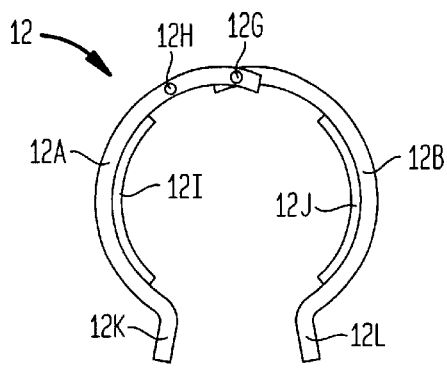
FIG. 4 is a plan view of one of the split-ring assemblies in its open position.
Figure 5:
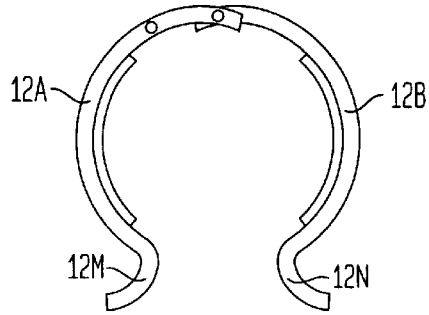
FIG. 5 is a plan view of one of the split-ring assemblies having curved extension portions.

Split-ring assembly 12 can also include extensions 12K and 12L extending away from half-rings 12A and 12B, respectively. More specifically, extensions 12K and 12L oppose one another when split-ring assembly 12 is closed (FIG. 2) and are positioned approximately 180° away from axis 12G forming the hinge point for split-ring assembly 12. When split-ring assembly 12 is opened (i.e., half-rings 12A and 12B pivot about axis 12G) as shown in FIG. 4, extensions 12K and 12L angle away from one another to define a funnel-shaped opening that facilitates the alignment and placement of split-ring assembly 12 on a cylindrical object to be clamped. Note that extensions 12K and 12L can be straight as shown in FIGS. 2 and 4, or can flit be curved outward as extensions 12M and 12N in FIG. 5.

Referring again to FIG. 1, split-ring assemblies 12 and 14 are coupled to one another in a spaced-apart relationship by, for example, a rigid bar 16 passing through the aligned holes (i.e., holes 12C and 12D) of split-ring assemblies 12 and 14. Although not illustrated, locking spacers (e.g,. washers, nuts or other type of stop) could be used to maintain the spacing between split-ring assemblies 12 and 14. The choice and use of such spacers is well known and will, therefore, not be described herein. Bar 16 serves as a hinge pin for each of split-ring assemblies 12 and 14 and, therefore, is sized so that each half-ring (e.g., half-rings 12A and 12B) can rotate thereon.

A rigid bar 18 extends through each additional hole 12H and 14H provided in respective half-rings 12A and 14A. Bar 18 must also be sized so that each half-ring 12A an 14A can pivot about bar 18 as bar 18 is moved up or down as will be explained further below.

Coupled to bars 16 and 18 is a control assembly that controls the opening and closing of split-ring assemblies 12 and 14. It is to be understood that a variety of control assemblies could be used, and that the one described herein is just one example of a suitable control assembly. A support frame 20 is coupled to bar 16 by means of, for example, support arms 22 and 24. One end of a control arm 26 is coupled to bar 18 while the other end of control arm 26 is pivotally coupled to one end of a second control arm 28 at a pivot point 30. Control arm 28 is pivotally coupled at its other end to one end of a third control arm 32 at a pivot point 34. Control arm 32 is pivotally coupled at its other end to a fixed support 36 at a pivot point 38. Although not required, fixed support 36 could be attached to support frame 20.

In operation, movement of control arm 32 (in the plane of the paper) in the direction of arrow 40 causes upward movement of control arm 26/bar 18 which, in turn, opens each split-ring assembly 12 and 14 as bar 18 moves up relative to bar 16. Conversely, movement of control arm 32 in the direction of arrow 42 causes downward movement of control arm 26/bar 18 which, in turn, closes each split-ring assembly 12 and 14 as bar 18 moves down relative to bar 16.

The advantages of the present invention are numerous. A single operator can use the mechanical clamp of the present invention to grasp (retrieve) or release (deploy) a cylindrical object. The simple construction and operation of the clamp assures its reliability during continued use.

Although the present invention has been described relative to specific examples thereof, it is not so limited. For example, a variety of materials can be used to construct clamp 10 such as metal, composites, or combinations thereof. Different ways of hingedly coupling each pair of half-rings to form a split-ring assembly could also be employed. For example, each split-ring assembly could be individually hinged and a bracket could be coupled to each individual hinge with the bracket defining the spacing between split-ring assemblies. Further, rather than using bar 18 in combination with holes 12H and 14H, a bracket could be attached to one half-ring of each split-ring assembly at the location of holes 12H and 14H. Control arm 26 would then be coupled to each such bracket. Still further, while the control assembly described above (i.e., control arms 26, 28 and 32) provides improved leverage and the ability to lock clamp 10 in a closed position, a single control arm could be used for lightweight cylindrical objects.

Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A clamp for cylindrical objects, comprising:
   a plurality of split-rings, each of said plurality of split-rings having a first half-ring and a second half-ring;
   first means for hingedly coupling said first half-ring to said second half-ring at a hinge point for each of said plurality of split-rings;
   second means coupled to each said first half-ring a distance from said hinge point that is defined by an arc on said first half-ring that does not exceed 90°; and
   third means coupled to said second means for selectively applying a pulling force thereto to simultaneously open each of said plurality of split-rings, and for selectively applying a pushing force thereto to simultaneously close each of said plurality of split-rings.

2. A clamp for cylindrical objects, comprising:
   a plurality of split-rings, each of said plurality of split-rings having a first half-ring and a second half-ring;
   first means for hingedly coupling said first half-ring to said second half-ring at a hinge point for each of said plurality of split-rings;
   second means coupled to each said first half-ring a distance from said hinge point;
   third means coupled to said second means for selectively applying a pulling force thereto to simultaneously open each of said plurality of split-rings, and for selectively applying a pushing force thereto to simultaneously close each of said plurality of split-rings;
   a first extension coupled to an end of each said first half-ring and extending away therefrom; and
   a second extension coupled to an end of each said second half-ring and extending away therefrom wherein, for each of said plurality of split-rings when said plurality of split-rings are closed, said first extension and said second extension oppose one another at a position approximately 180° away from said hinge point.

3. A clamp as in claim 2 wherein said first means is a rigid bar and wherein said plurality of split-rings are spaced apart from one another along said rigid bar.

4. A clamp as in claim 3 wherein said second means is a second rigid bar.

5. A clamp as in claim 4 wherein said third means comprises at least one rigid control arm coupled to said second rigid bar.

6. A clamp as in claim 4 wherein said third means comprises:
   a first control arm coupled at one end thereof to said second rigid bar;
   a second control arm pivotally coupled at one end thereof to another end of said first control arm; and
   a third control arm pivotally coupled at one end thereof to another end of said second control arm, said third control arm pivotally coupled at another end thereof to a fixed support, wherein movement of said third control arm brings about one of said pushing force and said pulling force.

7. A clamp as in claim 6 wherein each of said first control arm, said second control arm and said third control arm is rigid.

8. A clamp as in claim 6 wherein said support is attached to said rigid bar such that movement of said third control arm results in relative motion between said rigid bar and said second rigid bar.

9. A clamp as in claim 2 wherein said second means is a rigid bar.

10. A clamp as in claim 2 wherein, for each of said plurality of split-rings, opposing surfaces of said first half-ring and said second half-ring at least partially comprise an anti-skid surface.

11. A clamp as in claim 10 wherein said anti-skid surface comprises an anti-skid material affixed to at least portions of said opposing surfaces.

12. A clamp for cylindrical objects, comprising:
a plurality of split-rings, each of said plurality of split-rings having a first half-ring and a second half-ring, each said first half-ring and said second half-ring having a hole formed therethrough at one end thereof;
a rigid bar passing through each said hole in said plurality of split-rings for hingedly coupling each said first half-ring to a corresponding said second half-ring at a hinge point for each of said plurality of split-rings, wherein said plurality of split-rings are spaced apart from one another along said rigid bar;
first means coupled to each said first half-ring a distance from said hinge point that is defined by an arc on said first half-ring-that does not exceed 90°; and
second means coupled to said first means for selectively applying a pulling force thereto to simultaneously open each of said plurality of split-rings, and for selectively applying a pushing force thereto to simultaneously close each of said plurality of split-rings.

13. A clamp as in claim 12 further comprising:
a first extension coupled to an end of each said first half-ring and extending away therefrom; and
a second extension coupled to an end of each said second half-ring and extending away therefrom wherein, for each of said plurality of split-rings when said plurality of split-rings are closed, said first extension and said second extension oppose one another at a position approximately 180° away from said hinge point.

14. A clamp for cylindrical objects, comprising:
a plurality of split-rings, each of said plurality of split-rings having a first half-ring and a second half-ring, each said first half-ring and said second half-ring having a hole formed therethrough at one end thereof;
a rigid bar passing through each said hole in said plurality of split-rings for hingedly coupling each said first half-ring to a corresponding said second half-ring at a hinge point for each of said plurality of split-rings, wherein said plurality of split-rings are spaced apart from one another along said rigid bar;
first means coupled to each said first half-ring a distance from said hinge point;
second means coupled to said first means for selectively applying a pulling force thereto to simultaneously open each of said plurality of split-rings, and for selectively applying a pushing force thereto to simultaneously close each of said plurality of split-rings;
each said first half-ring having an additional hole formed therethrough at said distance from said hinge point, wherein said first means comprises a second rigid bar passing through each said additional hole.

15. A clamp as in claim 14 wherein said second means comprises at least one rigid control arm coupled to said second rigid bar.

16. A clamp as in claim 14 wherein said second means comprises:
a first control arm coupled at one end thereof to said second rigid bar;
a second control arm pivotally coupled at one end thereof to another end of said first control arm; and
a third control arm pivotally coupled at one end thereof to another end of said second control arm, said third control arm pivotally coupled at another end thereof to a fixed support, wherein movement of said third control arm brings about one of said pushing force and said pulling force.

17. A clamp as in claim 16 wherein each of said first control arm, said second control arm and said third control arm is rigid.

18. A clamp as in claim 16 wherein said support is attached to said rigid bar such that movement of said third control arm results in relative motion between said rigid bar and said second rigid bar.

19. A clamp as in claim 14 wherein, for each of said plurality of split-rings, opposing surfaces of said first half-ring and said second half-ring at least partially comprise an anti-skid surface.

20. A clamp as in claim 19 wherein said anti-skid surface comprises an anti-skid material affixed to at least portions of said opposing surfaces.

21. A clamp for cylindrical objects, comprising:
a plurality of split-rings, each of said plurality of split-rings having a first half-ring and a second half-ring, each said first half-ring and said second half-ring having a hole formed therethrough at one end thereof;
a first rigid bar passing through each said hole in said plurality of split-rings for hingedly coupling each said first half-ring to a corresponding said second half-ring at a hinge point for each of said plurality of split-rings, wherein said plurality of split-rings are spaced apart from one another along said first rigid bar;
each said first half-ring further having an additional hole formed therethrough at said distance from said hinge point;
a second rigid bar passing through each said additional hole;
means coupled to said second rigid bar for selectively applying a pulling force thereto to simultaneously open each of said plurality of split-rings, and for selectively applying a pushing force thereto to simultaneously close each of said plurality of split-rings;
a first extension coupled to an end of each said first half-ring and extending away therefrom; and
a second extension coupled to an end of each said second half-ring and extending away therefrom wherein, for each of said plurality of split-rings when said plurality of split-rings are closed, said first extension and said second extension oppose one another at a position approximately 180° away from said hinge point.

22. A clamp as in claim 21 wherein said means comprises:

a first control arm coupled at one end thereof to said second rigid bar;

a second control arm pivotally coupled at one end thereof to another end of said first control arm; and a third control arm pivotally coupled at one end thereof to another end of said second control arm, said third control arm pivotally coupled at another end thereof to a fixed support, wherein movement of said third control arm brings about one of said pushing force and said pulling force.

23. A clamp as in claim 22 wherein said support is attached to said first rigid bar such that movement of said third control arm results in relative motion between said first rigid bar and said second rigid bar.

* * * * *